United States Patent [19]
Karube et al.

[11] Patent Number: 4,930,135
[45] Date of Patent: May 29, 1990

[54] LASER OSCILLATOR DEVICE

[75] Inventors: Norio Karube, Machida; Akira Egawa, Minamitsuru; Etsuo Yamazaki, Hachioji; Nobuaki Iehisa, Minamitsuru; Mitsuo Manabe, Hachioji, all of Japan

[73] Assignee: Fanuc Ltd., Minamitsuru, Japan

[21] Appl. No.: 283,479

[22] PCT Filed: Apr. 28, 1988

[86] PCT No.: PCT/JP88/00426
§ 371 Date: Dec. 5, 1988
§ 102(e) Date: Dec. 5, 1988

[87] PCT Pub. No.: WO88/08630
PCT Pub. Date: Nov. 3, 1988

[30] Foreign Application Priority Data
Apr. 30, 1987 [JP] Japan ............................... 62-107827

[51] Int. Cl.$^5$ ............................................. H01S 3/00
[52] U.S. Cl. ........................................ 372/33; 372/38; 372/29
[58] Field of Search ................. 372/61, 33, 29, 38, 372/86, 81, 82, 87

[56] References Cited

U.S. PATENT DOCUMENTS

| | | | |
|---|---|---|---|
| 4,677,631 | 6/1987 | Pithie | 372/33 |
| 4,785,458 | 11/1988 | Kuzumoto et al. | 372/61 |

FOREIGN PATENT DOCUMENTS

| | | | |
|---|---|---|---|
| 0047487 | 3/1985 | Japan | 372/86 |
| 63-98171 | 4/1988 | Japan . | |

*Primary Examiner*—Léon Scott, Jr.
*Attorney, Agent, or Firm*—Staas & Halsey

[57] ABSTRACT

A laser oscillator device applies a high-frequency voltage to a plurality of discharge regions through a dielectric for producing a high-frequency discharge for laser pumping. Various interferences in the laser oscillator device are prevented to allow the device to produce a stable output. The laser oscillator device includes DC power supplies (DC12a, DC13a, DC13c, DC13d) and high-frequency power supplies (RF12b, RF13b, RF14b, RF15b) which are integrally coupled to prevent electromagnetic interference through cables for allowing stable laser oscillation and also to prevent various other interferences.

9 Claims, 8 Drawing Sheets

LASER OSCILLATOR DEVICE

CROSS REFERENCE TO RELATED APPLICATIONS

This application is related to the following copending applications assigned to the same assignee as this application:
1. U.S. Ser. No. 07/283,472 filed Nov. 30, 1988;
2. U.S. Ser. No. 07/273,520 filed Nov. 3, 1988;
3. U.S. Ser. No. 07/283,325 filed Dec. 5, 1988;
4. U.S. Ser. No. 07/295,203 filed Dec. 20, 1988.
5. U.S. Patent Application entitled: LASER OSCILLATOR DEVICE filed Jan. 12, 1989 having out Docket No. 645,103.

TECHNICAL FIELD

The present invention relates to a laser oscillator device for producing a high-power laser beam for cutting workpieces of metal or the like, and more particularly to a laser oscillator device capable of stable high-frequency discharge pumping.

BACKGROUND ART

High-frequency discharge pumping axial-flow $CO_2$ lasers are in the process of being developed because of their advantages of high-power output and stable oscillation. One example of such laser is disclosed in Japanese Patent Application No. 61-243212 filed by the applicant.

A conventional axial-flow-type high-frequency discharge pumping laser oscillator device is illustrated in FIG. 7 of the accompanying drawings. The illustrated laser oscillator device includes a discharge tube 1 comprising four tube segments. However, the discharge tube 1 may have a desired number of tube segments dependent on the output to be produced. A total reflection mirror 2 and an output coupling mirror 3 are accurately positioned at the ends of the discharge tube 1. Denoted at 4 is an outgoing laser beam. The segments of the discharge tube 1 have gas inlet and outlet ports connected to a single roots blower 7. Cooling units 5, 6 serve to cool a laser gas heated by the discharge and the roots blower 7. The laser gas flows in the discharge tube 1 and gas delivery tubes in the directions of the arrows. Electrodes $8a$, $8b \sim 11a$, $11b$ are connected to respective high-frequency power supplies 12, 13, 14, 15. The gas flows in the discharge tube 1 at the speed of about 100 m/second. An electric discharge is produced in the discharge tube 1 by a high-frequency voltage applied by the high-frequency power supplies $12 \sim 15$ to generate laser oscillation.

The principles of a conventional high-frequency power supply is illustrated in FIG. 8 of the accompanying drawings. Denoted at 16 in a DC power supply, and at 17 is a high-frequency (RF) power supply. DC output from the DC power supply 16 is applied to the high-frequency power supply 17. The high-frequency power supply 17 comprises a branch circuit comprising four FETs $18 \sim 21$, a boost transformer 22, and an impedance matching circuit 23. The output terminals of the high-frequency power supply 17 are coupled to the discharge tube 1 through electrodes $8a1$, $8a2$. A CT coil 24 serves to detect a current flowing through the discharge tube 1. A current feedback line 25 feeds back the detected current to control the current supplied to the discharge tube 1 to be constant.

The high-frequency discharge pumping laser has the following many advantages over the ordinary DC discharge pumping laser:
(i) Since it produces an electrode-free discharge, there is no problem of electrode material deterioration.
(ii) No ballast resistor is required.
(iii) There is no cathode drop, and high energy efficiency is obtained.
(iv) The laser can be operated at a low voltage and hence is safe for the operator.
(v) The dissociation ratio of $CO_2$ is low, and so is the running cost.
(vi) The laser has excellent pulse characteristics.
(vii) The laser device can be reduced in size.
(viii) The phenomenon of electron capture can be utilized by sufficiently increasing the frequency.
(ix) The freedom of selection of discharge tube materials is high.

However, the current and voltage of the high-frequency discharge pumping laser tend to oscillate based on various interferences because the power supplies and the discharge tube load are driven parallel to each other. Though one unit loop of a power supply and a load operates stably, the above phenomena occurs as the number of loops in parallel operation increases. Since the interferences are more noticeable between adjacent loops and can be neglected between those loops which are remote from each other, and also since the interferences are large if the cables are bundled, it is found that the interferences are caused by a coupling of electromagnetic waves between the cables of each power supply and load loop.

SUMMARY OF THE INVENTION

It is an object of the present invention to provide a high-frequency oscillator device which will solve the aforesaid problems and which will operate stably without instability which would otherwise result from such electro-magnetic wave interferences.

According to a first embodiment, there is provided a laser oscillator device for applying a high-frequency voltage to a plurality of discharge tubes made of a dielectric to produce a high-frequency discharge for laser pumping, comprising:
a DC power supply; and
a high-frequency power supply for converting a DC voltage into a high-frequency voltage, the DC power supply and the high-frequency power supply being integrally coupled to each other.

According to a second embodiment, there is provided a laser oscillator device for applying a high-frequency voltage to a plurality of discharge tubes made of a dielectric to produce a high-frequency discharge for laser pumping, the discharge tubes being electromagnetically shielded by a shield.

According to the first embodiment, by integrally combining the DC power supply and the high-frequency power supply, no coupling cables are employed, and any electromagnetic wave interferences which would otherwise be caused by electromagnetic coupling through cables are eliminated.

According to the second embodiment, electromagnetic wave interferences between the discharge tubes are eliminated by electromagnetically shielding the discharge tubes.

DESCRIPTION OF THE PREFERRED EMBODIMENTS

Embodiments of the present invention will hereinafter be described in specific detail with reference to the drawings.

Figure 1:
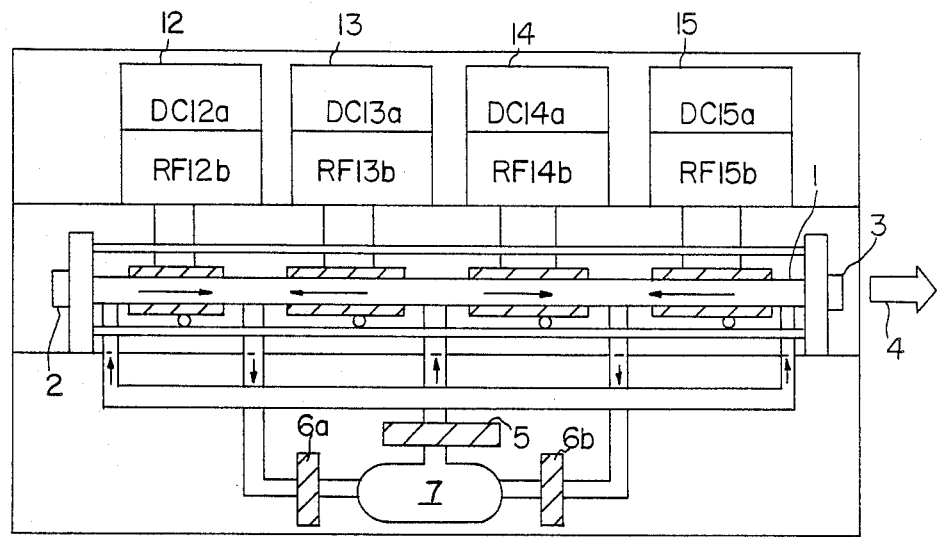
FIG. 1 is a view of an arrangement in which DC power supplies and high-frequency power supplies are integrally combined.

FIG. 1 is a view illustrating an arrangement in which DC power supplies and high-frequency power supplies are integrally combined. Designated at 1 is a discharge tube comprising four tube segments. However, the discharge tube 1 may have a desired number of tube segments dependent on the output to be produced. A total reflection mirror 2 and an output coupling mirror 3 are accurately positioned at the ends of the discharge tube 1. Denoted at 4 is an outgoing laser beam. The segments of the discharge tube 1 have gas inlet and outlet ports connected to a single roots blower 7. Cooling units 5, 6a and 6b serve to cool a laser gas heated by the discharge and the roots blower 7. The laser gas flows in the discharge tube 1 and gas delivery tubes in the directions of the arrows. Electrodes 8a, 8b ~ 11a and 11b are connected to respective high-frequency power supplies 12b, 13b, 14b and 15b. The gas flows in the discharge tube 1 at the speed of about 100 m/second. An electric discharge is produced in the discharge tube 1 by a high-frequency voltage applied by the high-frequency power supplies 12b ~ 15b to generate laser oscillation.

DC power supplies 12a ~ 15a are integrally coupled respectively to the high-frequency power supplies 12b ~ 15b. With this arrangement, cables used to connect the DC power supplies and the high-frequency power supplies are minimized and thus can be housed in electromagnetically shielded casings. Therefore, interferences between the power supply units can be neglected. A DC power supply and a corresponding high-frequency power supply may be housed in respective separate casings and may be coupled to each other. Alternatively, printed circuit boards having circuit functions of the respective DC and high-frequency power supplies may be accommodated in one casing. In the illustrated embodiment, the high-frequency power supplies 12a ~ 15b and the discharge tube 1 (electrodes) are coupled through short copper plates.

Figure 2:
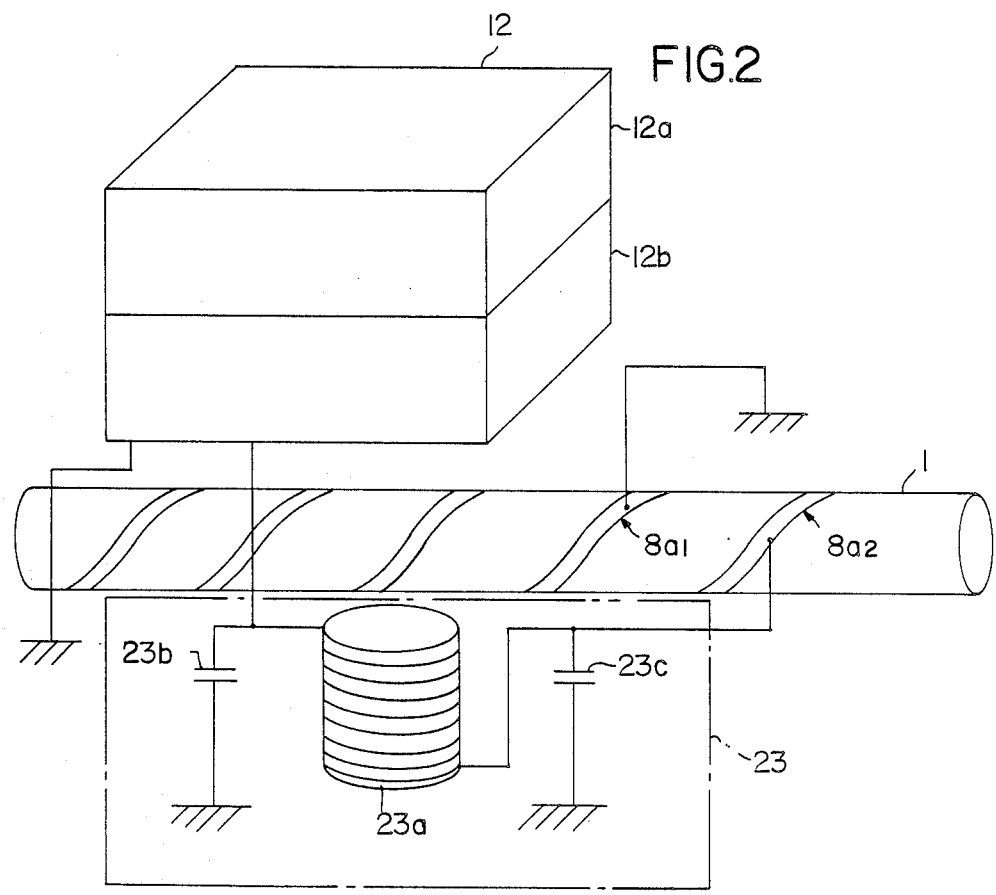
FIG. 2 is a view of an impedance matching circuit.

FIG. 2 shows the positional relationship between a unit power supply in which the DC power supply 12a and the high-frequency power supply 12b are coupled and an impedance matching circuit 23. The impedance matching circuit 23 comprises a coil 23a and capacitors 23b, 23c, and is disposed near the casing of the high-frequency power supply and the discharge tube 1. Because there is a wide area free of a metal member such as an iron plate in the matching circuit, particularly in the vicinity of the coil 23a, electromagnetic coupling can be achieved through the coil 23a. Since most of any loss current of the high-frequency power supply is an eddy current which would otherwise be induced by a metal member such as an iron plate near the coil 23a, the loss of power from the high-frequency power supply can be reduced.

Figure 3:
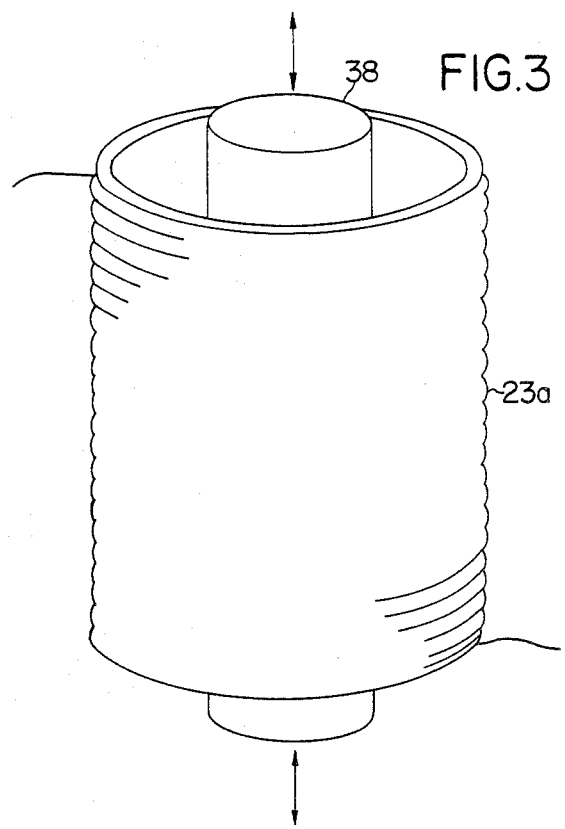
FIG. 3 is a view of a coil having a ferrite core.

FIG. 3 shows a coil with a ferrite core 38 disposed therein. The coil with the ferrite core shown in FIG. 3 produces less leakage of lines of magnetic force and less mutual interference than the air-core coil shown in FIG. 2. Impedance matching can easily be achieved by sliding the ferrite core 38 to position it in the coil as illustrated in FIG. 3.

Figure 4:
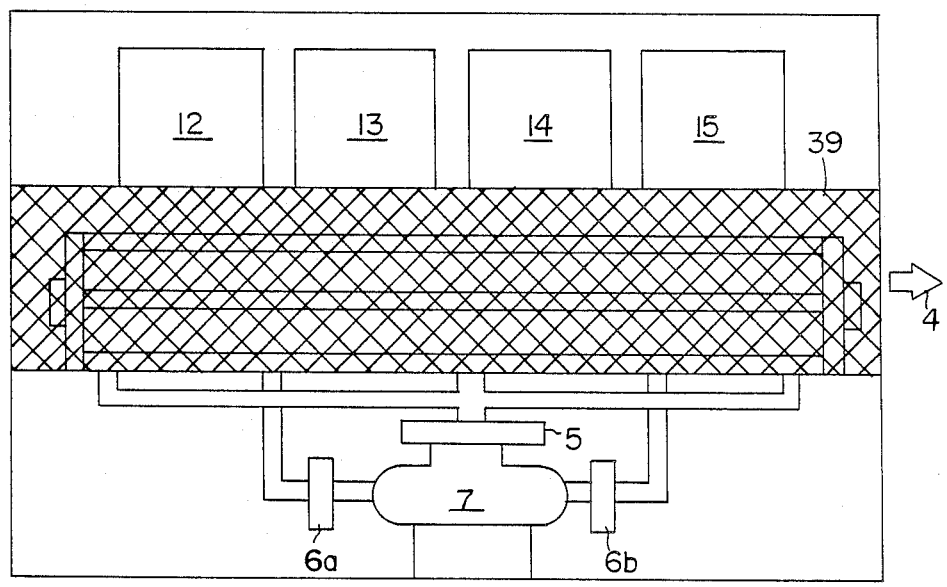
FIG. 4 is a view of shielded discharge tubes.

FIG. 4 shows a shielded discharge tube. Those parts which are identical to those in FIG. 1 are denoted by identical reference characters, and will not be described. A laser oscillator including a discharge tube 1 is electromagnetically shielded by a copper mesh 39. It is desirable that the copper mesh should actually be of a fine mesh size, although the illustrated mesh size is large. The copper mesh may be replaced with a copper plate.

Figure 5:
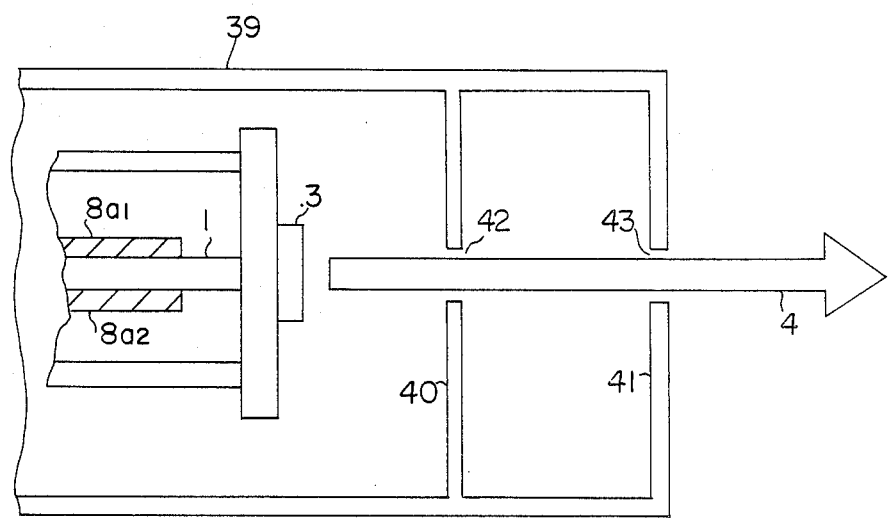
FIG. 5 is a view of the manner in which discharge tubes are shielded in the axial direction.

FIG. 5 illustrates shields at an outlet for the laser beam 4. In FIG. 5, two shield plates 40, 41 have respective through holes 42, 43 for passage of the laser beam 4 therethrough. Since a solid angle through the holes 42, 43 is sufficiently small, any leakage of electromagnetic waves can be neglected.

Figure 6:
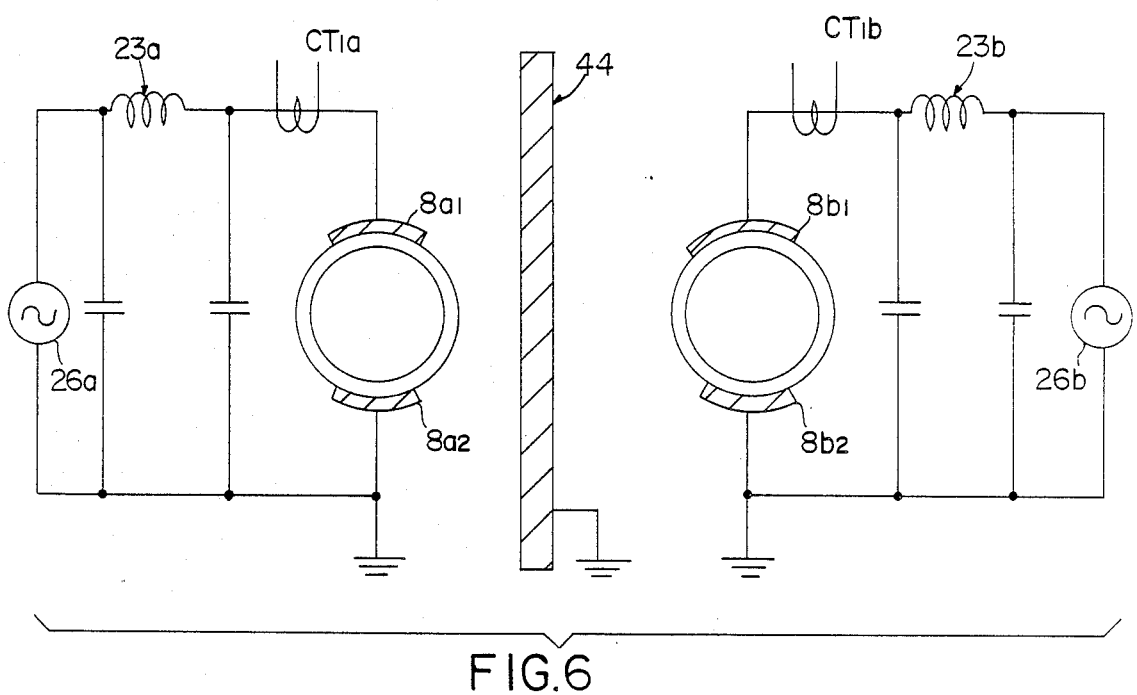
FIG. 6 is a view of the manner in which discharge tubes are shielded therebetween.
Figure 7:
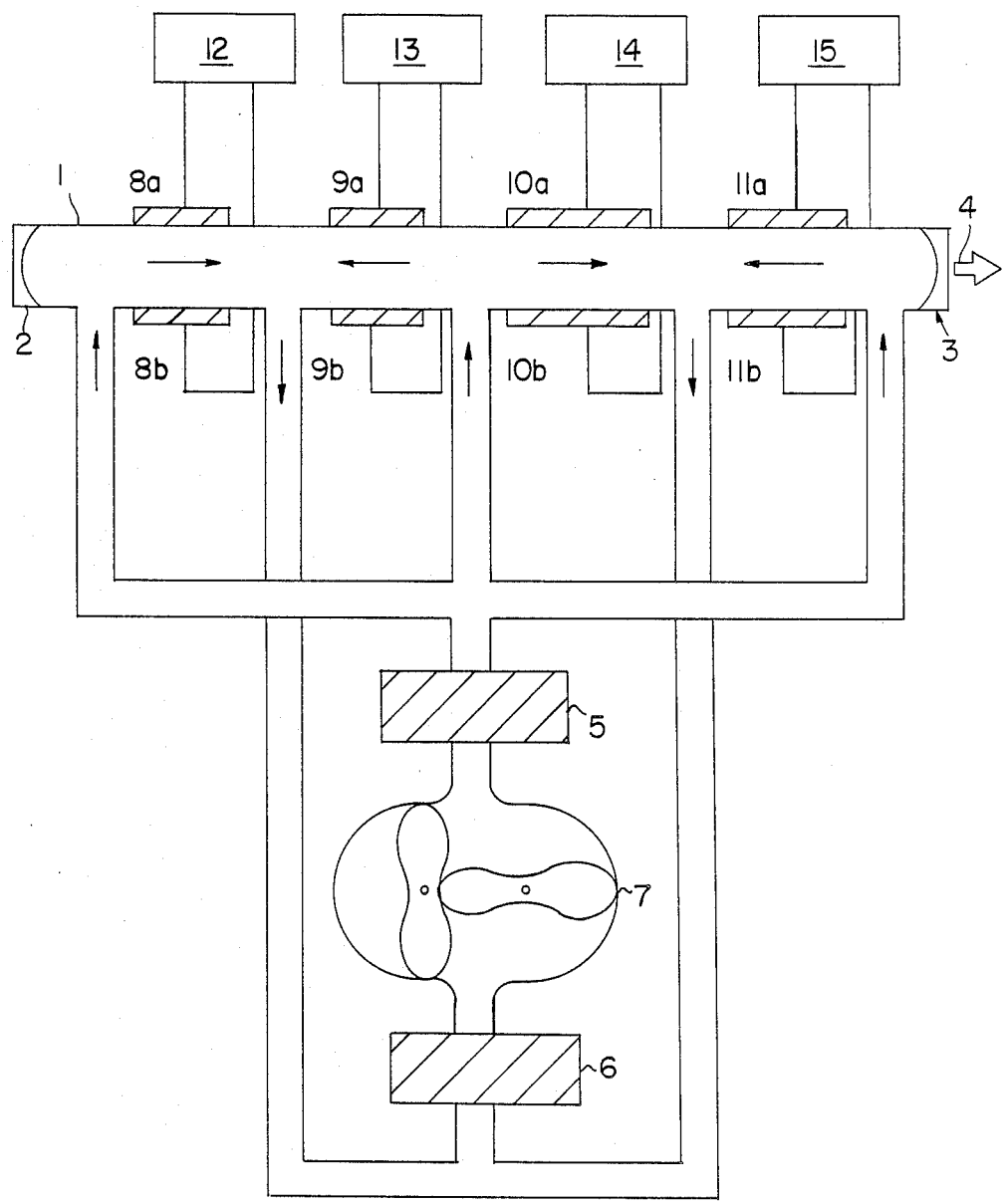
FIG. 7 is a view of the principles of a conventional axial-flow RF discharge pumping laser oscillator device.
Figure 8:
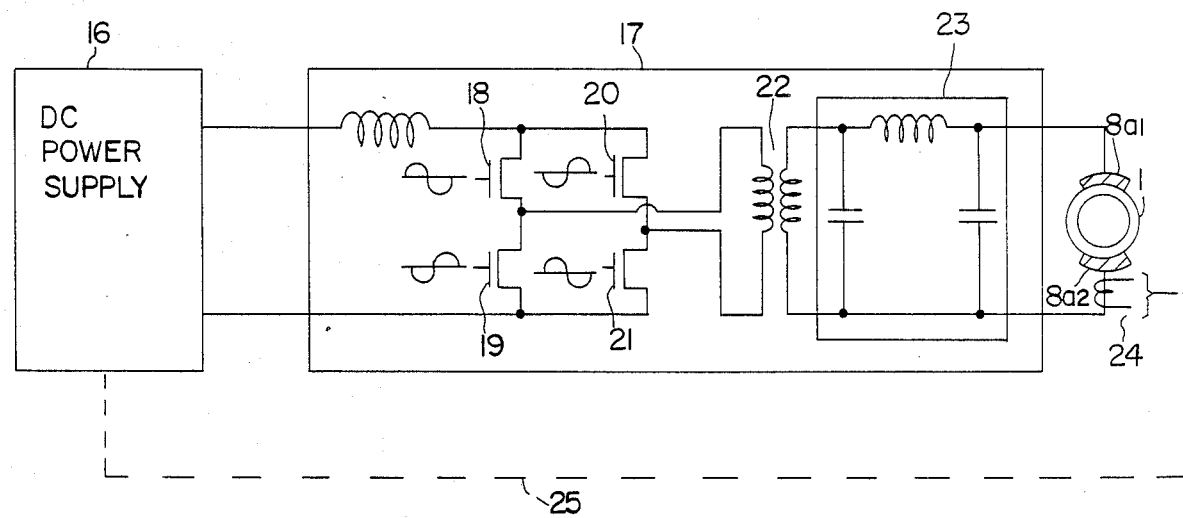
FIG. 8 is a view illustrating the principles of a conventional high-frequency power supply circuit for laser pumping.

FIG. 6 shows an electromagnetic shield between discharge tubes. Denoted at 26a, 26b are high-frequency power supplies, at 23a, 23b are impedance matching circuits, at 1a, 1b are separate discharge tubes, at CT1a, CT1b are current detectors, and 44 a shield plate which is grounded. The shield plate 44 serves to prevent electromagnetic interference between the discharge tubes 1a, 1b or lead plates.

With the present invention, as described above, since electromagnetic interferences between the units is eliminated, the laser oscillator device operates stably.

We claim:

1. A laser oscillator device for applying a high-frequency voltage to a plurality of discharge regions through a dielectric to produce a high-frequency discharge for laser pumping, comprising:
    DC power supply means for providing a DC voltage; and
    high-frequency power supply means for converting the DC voltage into a high-frequency voltage, the DC power supply coupled to each other to prevent electromagnetic and other interferences, thereby stabilizing said laser oscillator.

2. A laser oscillator device according to claim 1, further including an impedance matching circuit disposed near said integrally coupled DC power supply and high-frequency power supply.

3. A laser oscillator device according to claim 2, wherein said impedance matching circuit includes a coil having an air core.

4. A laser oscillator device according to claim 2, wherein said impedance matching circuit includes a coil having a ferrite core.

5. A laser oscillator device according to claim 4, wherein said ferrite core is slidable.

6. A laser oscillator device according to claim 1 further comprising:

discharge tubes connected to receive the high-frequency voltage; and a shield positioned to electromagnetically shield the discharge tubes.

7. A laser oscillator device according to claim 6, wherein said shield comprises a metal mesh.

8. A laser oscillator device according to claim 6, wherein said shield is positioned in a plane perpendicular to an axial direction of the discharge times.

9. A laser oscillator device according to claim 6, wherein said shield comprises a shield metal plate disposed between the discharge tubes.

* * * * *

UNITED STATES PATENT AND TRADEMARK OFFICE
CERTIFICATE OF CORRECTION

PATENT NO. : 4,930,135
DATED : May 29, 1990
INVENTOR(S) : Karube et al.

It is certified that error appears in the above-identified patent and that said Letters Patent is hereby corrected as shown below:

Claim 1, Col. 4, line 52, after "supply" should be --means and the high-frequency power supply being integrally--;

Claim 8, Col. 6, line 2, "times" should be --tubes--.

Signed and Sealed this

Eighteenth Day of June, 1991

Attest:

HARRY F. MANBECK, JR.

*Attesting Officer*

*Commissioner of Patents and Trademarks*